Jan. 2, 1951      J. NOVAK      2,536,564
DIFFERENTIAL DRIVE ROTARY FLUID COUPLING

Filed Feb. 4, 1946      2 Sheets-Sheet 1

John Novak
INVENTOR.

BY *CA Snow Co.*
ATTORNEYS.

Jan. 2, 1951 J. NOVAK 2,536,564
DIFFERENTIAL DRIVE ROTARY FLUID COUPLING
Filed Feb. 4, 1946 2 Sheets—Sheet 2

John Novak
INVENTOR.

BY *[signature]*
ATTORNEYS.

Patented Jan. 2, 1951

2,536,564

UNITED STATES PATENT OFFICE 2,536,564

DIFFERENTIAL DRIVE ROTARY FLUID COUPLING

John Novak, Perth Amboy, N. J., assignor of one-half to Frank Novak, Old Bridge, N. J.

Application February 4, 1946, Serial No. 645,285

2 Claims. (Cl. 60—54)

This invention relates to a fluid drive and more especially to a new and novel form of differential wherein motion is transmitted from a rotary drive element to separate driven elements by a fluid contained within the housing of the differential.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1:
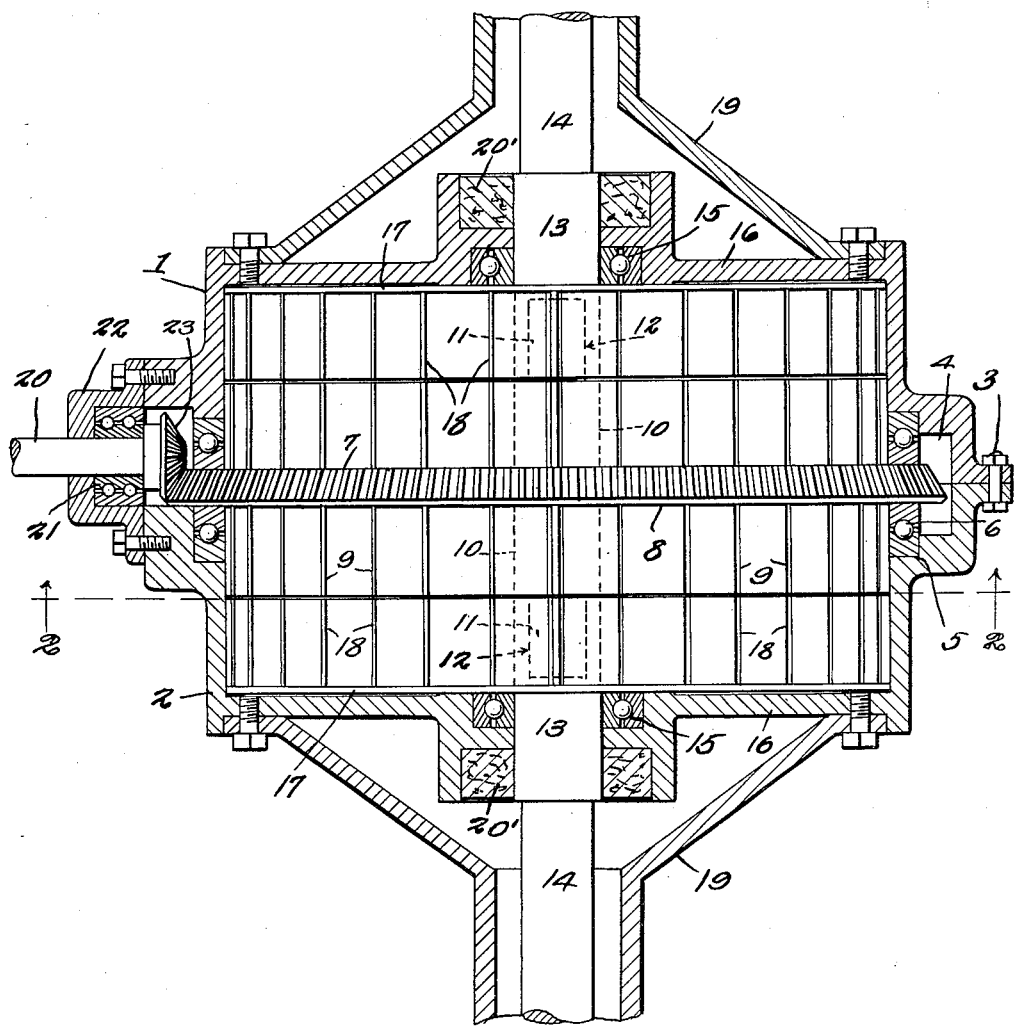
Figure 1 is a transverse section through the housing of the mechanism, the rotatable parts therein being in plan.

Referring to the figures by characters of reference 1 and 2 designate housing members which can be detachably joined at their margins as indicated at 3, the meeting portions of these members cooperating to define an annular channel 4 the side walls of which are recessed as at 5 to receive antifriction bearing 6 which serve to support and properly center the gear 7 of a drive rotor 8. This rotor includes oppositely extending series of radial blades 9 having a working contact with the inner surface of the housing. The drive rotor can be mounted on the intermediate portion of a shaft 10 having concentric studs 11 projecting therefrom and these studs can project into sockets 12 formed within the enlarged ends 13 of oppositely extending shafts 14. The shafts are mounted in antifriction bearings 15 carried by the heads 16 of the housing members 1 and 2 and each of these portions 13 has a disk 17 rotatable therewith and supported close to the adjacent head 16. Radial blades 18 extend laterally from each of the disks 17 and radiate from the shaft portion 13, the inner edges of these blades terminating in a plane which is close to and parallel with the path of the adjacent blades 9. Thus each set of radial blades 18 together with their disk 17 and their shaft 13 cooperate to form a driven rotor.

The shafts 14 can be positioned within housing extensions 19 and any suitable sealing means such as indicated at 20' can be provided for preventing leakage of fluid from the housing members 1 and 2 along the shafts 13—14.

A drive shaft 20 can be mounted in a bearing 21 located within a bearing extension 22 on the housing formed by the members 1 and 2 and this shaft 20 carries a gear 23 in mesh with the gear 7.

It is to be understood that the housing formed by the members 1 and 2 contains a suitable fluid which fills all of the spaces in the housing. Thus when the drive rotor is actuated by the gears 23 and 7 the opposed series of blades 9 will set up a swirling action of the fluid which, in turn, will pick up the blades 18 of the driven rotors and cause the same to rotate with the drive rotor thereby causing motion to be transmitted to the shafts 14. As there is no positive connection between the drive and driven rotors, it will be obvious that either of the driven rotors can be retarded relative to the other when resistance to the rotation of its shaft 14 is encountered. Thus the described mechanism constitutes an excellent differential for use in motor vehicles.

It is to be understood that there is no invention in the particular manner in which the rotors and their shafts are mounted. The various bearings, shafts, etc. have been illustrated and described merely as one arrangement which might be utilized.

Figure 2:
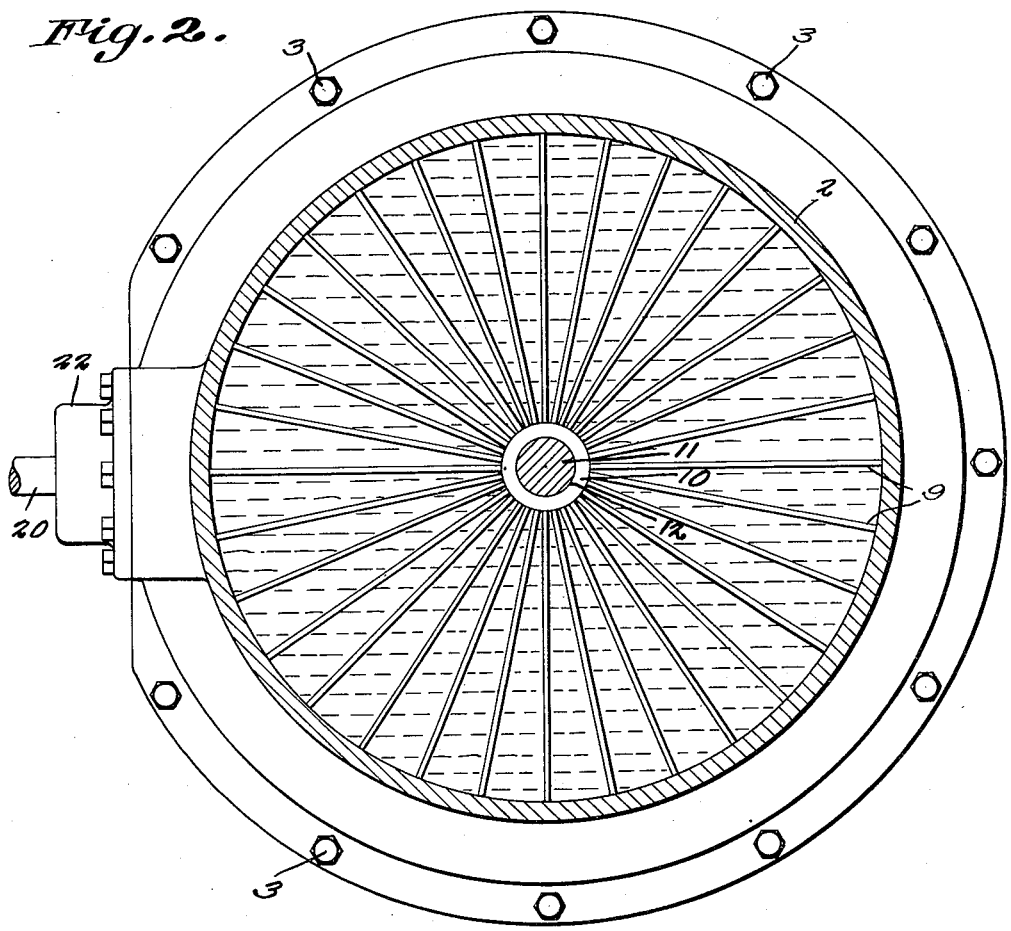
Figure 2 is a section on line 2—2 Fig. 1.
Figure 3:
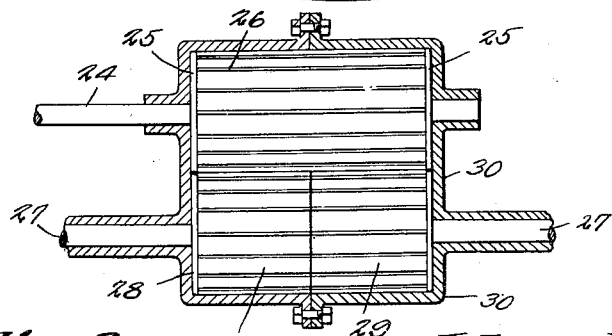
Figure 3 is a transverse section through a modified structure.

Instead of having the rotors all mounted for movement about a common axis, as shown in Figures 1 and 2, a modified structure such as illustrated in Figure 3 might be employed. In this modified form the drive rotor comprising a drive shaft 24, heads or disks 25 and radial blades 26 interposed between the heads or disks and carried by the shaft, can be positioned parallel with aligned driven shafts 27 each of which has a disk or head 28 against which extend the outer ends of annular series of blades 29 radiating from the respective shafts 27. Each set of blades and its disk and shaft thus cooperate to form a driven rotor and the two driven rotors, as shown in Figure 3, are located in a suitably shaped housing 30, preferably integrally formed to provide communicating cylindrical chambers carrying respectively the drive rotor, and the driven rotors, and filled with a suitable fluid. Thus when the drive rotor is actuated by its shaft 24, the fluid in the housing will serve to transmit motion from the drive rotor to the two driven rotors and as these latter rotors are not connected, the modified mechanism is also useful as a differential.

What is claimed is:

1. A differential including a housing comprising opposed housing sections each formed integrally with a cylindrical side wall and a closed outer end, the inner ends being open and having their marginal portions outwardly flanged to constitute means for detachably joining the housing sections, said flanged portions being proportioned when joined to define an annular peripheral groove within the housing and intermediate its ends, a pair of driven rotors each mounted for rotation in one of the housing sections, each of said driven rotors comprising a shaft journaled in the adjacent closed end of the section and radial blades carried by the shaft next to said adjacent closed end, and a drive rotor mounted at the center of the housing and extending across the housing to divide the housing into separate working chambers, the periphery of the drive rotor being extended into the peripheral groove and being formed as a gear for powering the drive rotor from an exterior source, said drive rotor including radial blades extending from opposite faces thereof into close spaced relation with the blades of the respective driven rotors.

2. A differential including a housing comprising opposed housing sections each formed integrally with a cylindrical side wall and a closed outer end, the inner ends being open and having their marginal portions outwardly flanged to constitute means for detachably joining the housing sections, said flanged portions being proportioned when joined to define an annular peripheral groove within the housing and intermediate its ends, a pair of driven rotors each mounted for rotation in one of the housing sections, each of said driven rotors comprising a shaft journaled in the adjacent closed end of the section and radial blades carried by the shaft next to said adjacent closed end, there being a socket formed in each shaft, a drive rotor mounted at the center of the housing and extending across the housing to divide the housing into separate working chambers, the periphery of the drive rotor being extended into the peripheral groove and being formed as a gear for powering the drive rotor from an exterior source, and said drive rotor including a shaft projecting from opposite faces thereof and formed with studs on its ends extending into and rotatable within the sockets, and radial blades extending from opposite faces of the drive rotor into close spaced relation with the blades of the respective driven rotors.

JOHN NOVAK.

REFERENCES CITED

The following references are of record in the file of this patent:

UNITED STATES PATENTS

| Number | Name | Date |
|---|---|---|
| 1,613,154 | Bauer et al. | Jan. 4, 1927 |
| 2,141,940 | Sinclair | Dec. 27, 1938 |
| 2,287,498 | Scofield | June 23, 1942 |
| 2,336,167 | Dillon | Dec. 7, 1943 |
| 2,465,919 | Novak | Mar. 29, 1949 |